United States Patent [19]

Hobson

[11] Patent Number: 4,892,172

[45] Date of Patent: Jan. 9, 1990

[54] SHAFT LOCK ASSEMBLY

[75] Inventor: James C. Hobson, Traverse City, Mich.

[73] Assignee: Cadillac Gage Textron Inc., Warren, Mich.

[21] Appl. No.: 275,517

[22] Filed: Nov. 23, 1988

[51] Int. Cl.$^4$ ............................................. F16D 65/32
[52] U.S. Cl. ........................................ 188/69; 74/530
[58] Field of Search .................. 74/530, 813 L, 822; 188/31, 67, 69, 80, 82.3, 82.34, 82.7, 82.77

[56] References Cited

U.S. PATENT DOCUMENTS 3,187,846  6/1965  Powell ................................. 188/69
3,241,637  3/1966  Temple ................................ 188/69

Primary Examiner—Duane A. Reger
Attorney, Agent, or Firm—John C. Evans

[57] ABSTRACT

A shaft lock assembly has a stator and a plurality of radially disposed, reciprocating lock vanes that are moved on the stator to lock and release a shaft. The vanes are held in their locked position by a rotatable cam ring. A rotatable cam scroll lifts the vanes from their locked position and positions the vanes in their released position. The vanes and shaft have coacting surfaces to produce a regenerative separating force on the vanes from a locked shaft which is under torque as the shaft is unlocked.

11 Claims, 3 Drawing Sheets

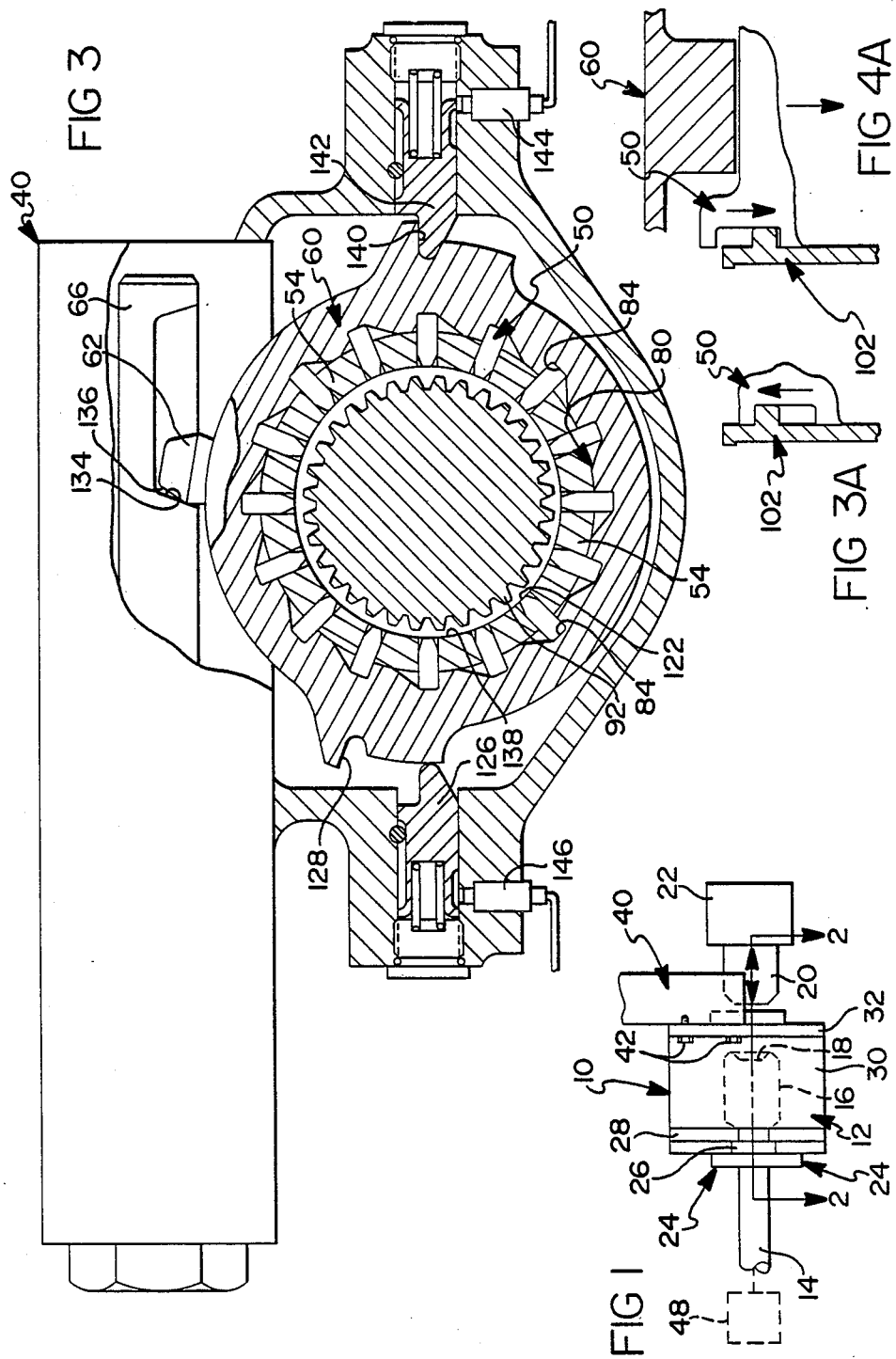

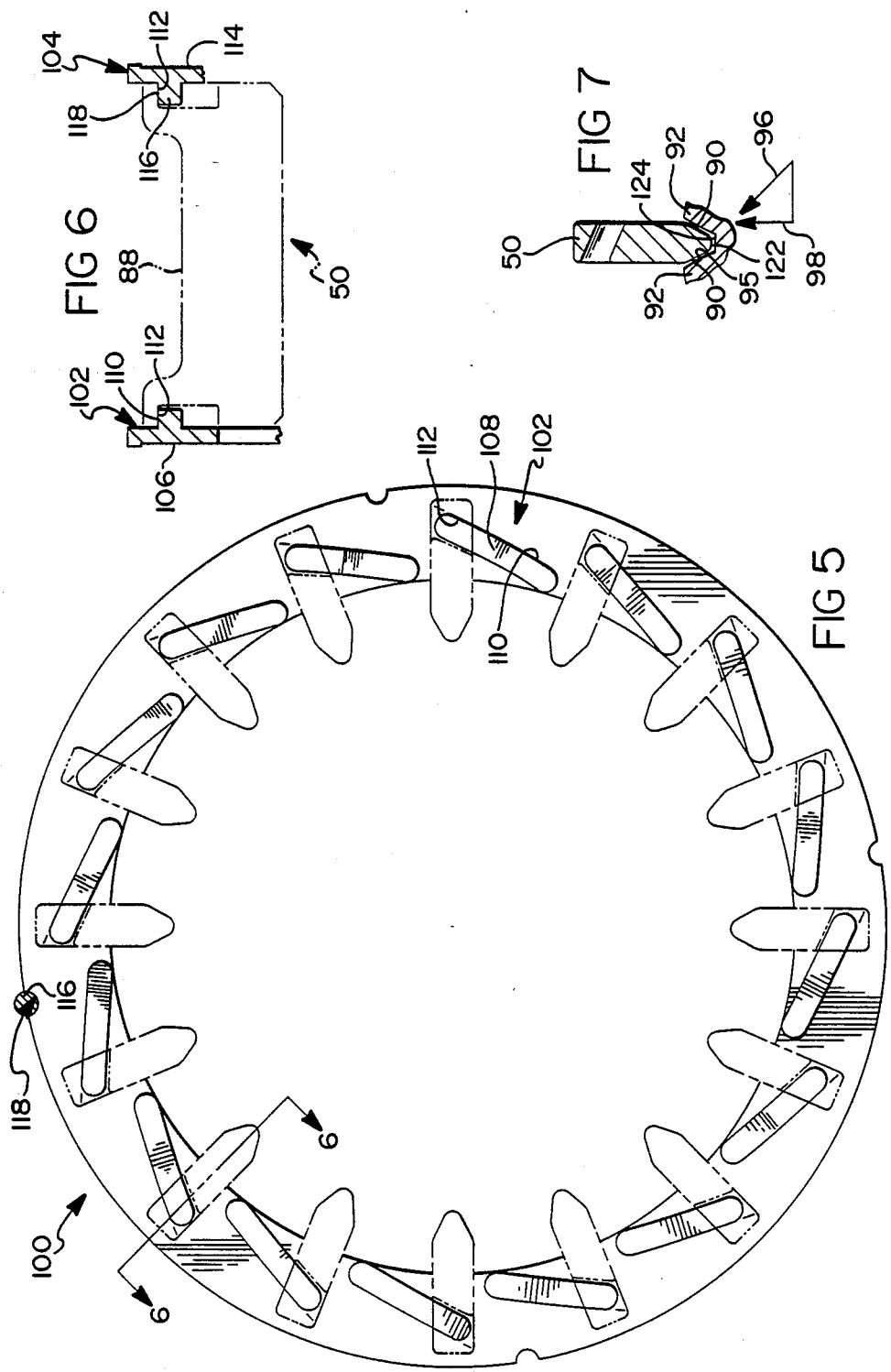

SHAFT LOCK ASSEMBLY

BACKGROUND OF THE INVENTION (1) Technical Field

The subject invention relates to rotary lock assemblies and particularly to rotary lock assemblies for mechanically securing a rotatable shaft having a torque load thereon.

(2) Description of the Prior Art

Various proposals have been suggested to hold a torque shaft against rotation. For example, prior art devices have included band type friction brakes and various forms of friction clutch mechanisms. While suitable for their intended purpose, such prior art shaft braking mechanisms have relied upon frictional force to retain a torque shaft in a locked position.

Such braking mechanisms do not provide a direct physical mechanical interlock between a ground point and the torque shaft.

SUMMARY OF THE INVENTION AND ADVANTAGES

The rotary lock mechanism of the present invention has a housing which surrounds the end extension of a shaft portion of an operating system. In certain applications, it is desirable to lock such a shaft extension which thereafter may be subjected to torque loading from external means. In such situations it is necessary, on command, to provide a quick lock release system that will enable the lock mechanism components to separate from the torque shaft without impeding acceleration of the torque shaft after it is unlocked.

One feature of the present invention is to provide a lock mechanism which is located circumferentially around the shaft extension and operative to provide a direct mechanical lock between the outer peripheral surface of the shaft extension and a ground point while providing for release of the locking components from the shaft extension when it is under a torque load so as to release the shaft extension without impeding acceleration of and without damaging the mechanical components of the locking mechanism.

Another feature of the present invention is to provide an improved mechanism for preventing rotation of a torque shaft and to do so by means of a system wholly located radially outwardly of the outer circumference of the torqued shaft.

Still another feature of the present invention is to provide a lock mechanism located wholly outside of the outer circumference of a torque shaft wherein a plurality of locking components are concurrently moved into interlocking engagement with the periphery of the torque shaft during a locking mode and/or simultaneously removed from interlocked relationship with the outer circumference of the torque shaft during the unlocking mode of operation.

Yet another feature of the present invention is to provide an improved rotary lock assembly for securing a driven shaft having a torque selectively imposed thereon operative to lock the torque shaft against rotation and further operative to release the torque shaft without interfering with its acceleration or without damaging mechanical locking components selectively positioned into and out of mechanically interlocked relationship with the outer periphery of the shaft.

Yet another feature of the present invention is to provide a rotary lock assembly of the type set forth in the preceding object wherein the locked shaft is surrounded by an annular stator having a plurality of guide slots therein, each having a lock component slideably supported therein; and wherein a cam ring is located circumferentially around the stator and is relatively rotated with respect thereto having a plurality of circumferentially spaced guide surfaces thereon engageable with the heads of the locking components to position the locking components into and out of an interlocked engagement with the rotating shaft.

Still another object of the present invention is to provide a tapered surface on the inboard end of each of the locking components and to provide a gear surface on the outer circumference of the lock shaft that are operatively associated to produce a resultant regenerative force on the locking components to release them from the shaft when it is unlocked.

Still another object of the present invention is to provide separate means for lifting each of the locking components from the locked shaft to assist the regenerative forced release of the locking components and to hold them in a released position once the regenerative force is removed therefrom.

Still another object of the present invention is to provide an improved rotary lock assembly for locking a torque shaft and for releasing the locked torque shaft by use of a regenerative release force in part attributable to the forces acting on the torque shaft and to do so by use of a lock assembly having a stator supported thereon with a plurality of circumferentially located guide slots therein each having a lock vane slideably supported therein. Each of the lock vanes having a head segment at the outboard end thereof and including a tapered surface on the inboard end thereof. A rotary ring cam is located circumferentially radially outwardly of each of the lock vane heads and includes a plurality of circumferentially spaced guide surfaces thereon each having a first dwell segment that is rotatable with respect to the lock vane head to mechanically secure each of the lock vane tips in an interlocked position with respect to gear teeth on the torque shaft for providing a direct metal to metal multiple point mechanical lock between a ground point and the torque shaft for locking it in position; and wherein lift means are provided to positively lift each of the vanes and hold them out of engagement with the shaft extension following the regenerative force release of the vanes from the shaft as it is accelerated with respect to the component parts of the rotary lock assembly when the torque shaft is released for acceleration from its locked position. These actions are initiated by rotation of the ring cam.

BRIEF DESCRIPTION OF THE PRESENT INVENTION

Other advantages, features and capabilities of the present invention will be readily appreciated as the same become better understood by reference to the following detailed description when considered in connection with the accompanying drawings wherein:

FIG. 1 is a top elevational view of a rotary lock mechanism of the present invention;

FIG. 3 is a sectional view taken along the line 3—3 of FIG. 2, looking in the direction of the arrows;

FIG. 3A is a fragmentary sectional view of the release position of a vane;

FIG. 4A is a fragmentary section view of the lock position of a vane;

FIG. 5 is a sectional view taken along the line 5—5 of FIG. 2, looking in the direction of the arrows;

FIG. 6 is a sectional view taken along the line 6—6 of FIG. 5, looking in the direction of the arrows; and FIG. 7 is an enlarged sectional view of the region identified by numeral 7 in FIG. 4.

DESCRIPTION OF THE PREFERRED EMBODIMENT

Figure 4:
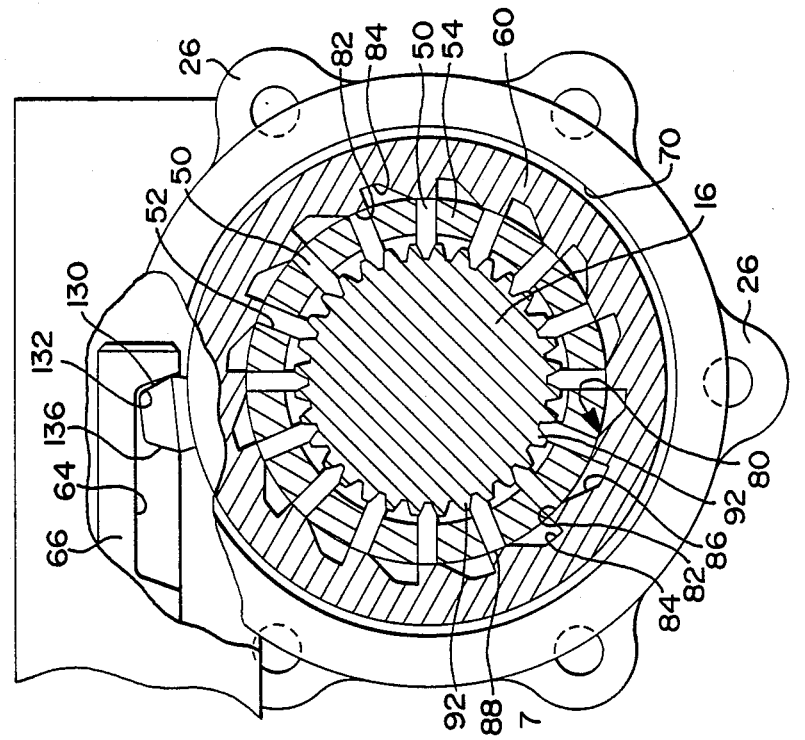
FIG. 4 is a view like FIG. 3 showing the rotary lock mechanism in another operative position.

Referring now to FIG. 1, a rotary lock assembly 10 is illustrated. The rotary lock assembly 10 has a housing 12 and includes a shaft 14 directed interiorly of the housing 12. The shaft 14 more particularly includes an end extension 16 thereon which can be selectively connected with a socket 18 therein which is adapted to be connected to a second shaft 20 under the control of a coupling actuator device 22 in order to phase relate the shaft 14 and the shaft 20.

The rotary lock assembly 10, while being illustrated in conjunction with a shaft 14 and a shaft 20 that are phase related with one another, is equally suited for use in a shaft drive system in which a drive unit is connected to a shaft such as shaft 14 for directing a drive torque thereto. In many of such systems, it is desirable to lock the shaft against rotation during certain operating modes and then providing a quick release system for enabling the locked, torqued shaft 14 to quickly accelerate to an operating load condition.

Figure 2:
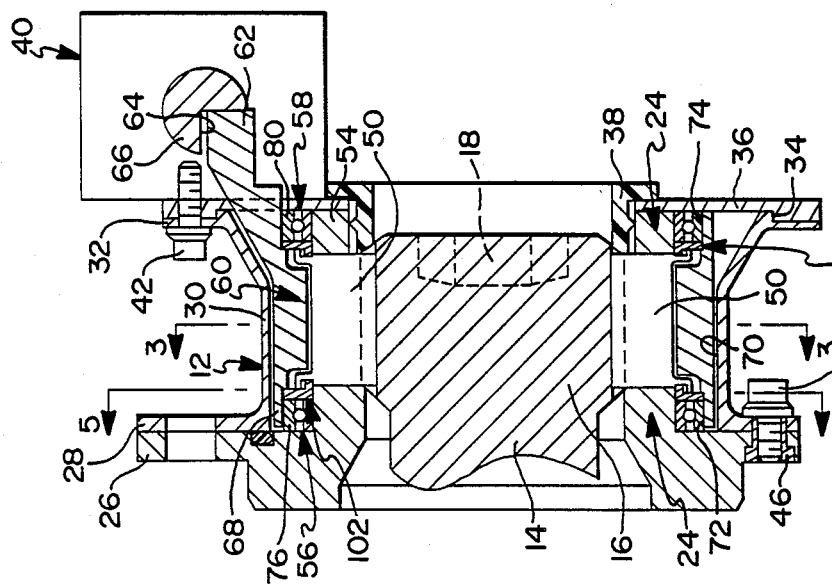
FIG. 2 is a cross sectional view taken along the line 2—2 of FIG. 1, looking in the direction of the arrows.

In order to accomplish this objective in the illustrated embodiment of the rotary lock assembly 10, the housing assembly 12 (as best shown in FIGS. 2, 3) includes a stator 24 having a plurality of circumferentially spaced, radial lugs 26 joined to a flange 28 of an annular enclosure 30. The annular enclosure 30 has a second flange 32 thereon located in spaced parallel relationship to the flange 28. The second flange 32 is configured to define an annular shoulder 34 on which is supportingly received an end cover 36 for the housing 12. The end cover 36 is connected to stator 24 by retainer 38.

A hydraulic actuator 40 is secured to the upper end of the housing 12 by bolts 42 as shown in FIG. 1.

The annular enclosure 30 is connected to the stator 24 by a plurality of fasteners representatively illustrated as including screws 44 and nuts 46.

The aforedescribed structure represents a fixed ground point having a substantial torque resisting capacity by being connected to means (not shown) which will resist torque on the shaft 14.

One feature of the present invention is that the rotary lock assembly 10 is operable to mechanically lock the shaft 14 to enable a drive unit 48 to be operated prior to transfer of power therefrom in order to precheck the various operating systems of the drive unit 48. In order to accomplish this objective, the stator 24 is provided with a plurality of mechanical lock components representatively shown in the illustrated arrangement as being lock vanes 50 that are slideably supported by the stator 24 to provide a direct mechanical connection between the stator 24 and the shaft 14. The vanes 50 are operated to selectively lock shaft 14 to the fixed stator 24 and to operatively disconnect the stator 24 from the shaft 14 following testing of the systems in the drive unit 48.

More particularly, each of the lock vanes 50 is slideably supported in a vane slot 52 each of which is located at circumferentially spaced points around a center hub 54 of the stator 24. The center hub 54 carries spaced ball bearing assemblies 56, 58 that in turn rotatably support a cam ring 60.

As best shown in FIG. 3, the cam ring 60 has a lug 62 formed integrally therewith that fits in a slot 64 of a reciprocating piston 66 of the hydraulic actuator 40. The slot 64 has a greater length than the width of the lug 62 for reasons to be discussed.

The cam ring 60 more particularly includes an outer annular segment 68 (FIG. 2) thereon in close spaced relationship to the inner surface 70 of the annular enclosure 30.

Spaced inboard surface segments 72, 74 of the annular segment 68 are supported by the outer race 76 of the ball bearing assembly 56 and the outer race 80 of the ball bearing assembly 58 respectively. Accordingly, the cam ring 60 is supported for stable and accurate rotation with respect to the center hub 54 of the stator 24 as it is rotated therearound by the piston 66.

One feature of the present invention is that the cam ring 60 includes a contoured inner surface 80. The contoured inner surface 80 has a precisely mathematically calculated series of contours formed therein each of which includes a dwell surface 82 located at the radially innermost points on the contoured inner surface 80. The dwell surfaces 82 are located at circumferentially spaced positions on the contoured inner surface 80 and serve to define a plurality of spaced points for locating each of the lock vanes 50 in an interlocked relationship with the shaft extension 16.

The contoured inner surface 80 further includes a plurality of radially outwardly located dwell surfaces 84 that define circumferentially spaced reference points for seating the lock vanes 50 in a position released from the shaft extension 16.

The contoured inner surface 80 further includes a plurality of mathematically calculated curved surface segments 86 that will act on the head 88 of each of the lock vanes 50 to smoothly slide each of the lock vanes 50 in the lock vane slots 52 as the cam ring 60 is being rotated so as to force each of the lock vanes 50 radially inwardly toward the center hub 54 of the stator 24 into locking engagement with the end extension 16 as best shown in FIG. 4.

Another feature of the present invention is that each of the lock vanes 50 includes a pair of spaced tapered surfaces 90 on the radially inner most end thereof. The tapered surfaces 90 each cooperate with an involute gear tooth 92 formed on the outer periphery 94 of the end extension 16. Each of the involute gear teeth 92 more particularly includes a pair of inclined tooth surfaces 95 which are in engagement with the tapered surfaces 90 when the lock vanes 50 are held by the dwell surfaces 82 in a shaft locking position. As shown in the enlarged fragmentary view of the tapered surfaces 90, once the cam ring 60 is rotated by the action of operating piston 66, a regenerative force component 96 is directed onto each of the lock vanes 50. A radially outwardly located component 98 of the regenerative force produced by the torque on the shaft 14 will be directed to force each of the lock vanes 50 in a radially outwardly directed manner so as to clear the tapered surfaces 90 thereon away from the inclined surfaces 95 of each of the gear teeth 92. Consequently, the rotation of the cam ring 60 in an unlocking direction will be accomplished without impeding acceleration of the shaft 14. Furthermore, the regenerative force acting on the vanes 50 will quickly disengage them from the gear teeth 92 so as to prevent any excessive wear or damage to the lock vanes 50 and the involute gear teeth 92 formed thereon.

Another feature of the present invention is that in addition to the regenerative release force component 98, each of the lock vanes 50 is positively lifted from the shaft 14 as the cam ring 60 is rotated from its locked position to the release position shown in FIGS. 3 and 5. To accomplish this purpose, a lift mechanism 100 is provided. The lift mechanism includes a pair of spaced scroll cams 102, 104. The scroll cam 102 has a surface 106 thereon which seats against the bearing assembly 56. It further includes a plurality of axially directed cams 108 (FIG. 5) thereon each of which has a surface 110 that is congruent with the surfaces defined by each set of the dwell surface 82, the dwell surface 84 and the interconnecting curved surface 86. The cam surface 110 is engaged within a vane slot 112.

Likewise, scroll cam 104 has a surface 114 thereon that seats against the bearing assembly 58. It has a plurality of circumferentially spaced cams 116 thereon, each having a cam surface 118 configured like the cam surface 110.

Each of the scroll cams 102, 104 is connected to the cam ring 60 to be rotated therewith. Specifically, an index pin 116 is located through key slots 118 formed at four equidistantly spaced points on each of the scroll cams 102, 104 at the outer periphery thereof. The index pins 116 will lock the scroll cams 102, 104 to the cam ring 60 for simultaneous rotation with the cam ring 60 in response to operation of the hydraulic actuator 40 for locking and unlocking the shaft 14.

More specifically, during rotation of the cam ring 54 from the release position of FIG. 3 to the lock position of FIG. 4, the cam surfaces 86 are moved with respect to side slots 112 in the head portion 88 of each of the lock vanes 50 to cause radially inwardly directed movement of the lock vanes 50. The locking movement of the lock vanes 50 occurs when the shaft 14 is unloaded (has no torque thereon).

Consequently, each of the tapered surfaces 90 on the radially innermost end of each lock vane 50 will be piloted into the shaft end extension 16 at the involute gear teeth 92 thereon. The shaft 14 will adjust in either a clockwise or counterclockwise direction until each of the teeth surfaces 90 are in their fully radially inwardly directed location where the base surface 122 of each of the lock vanes 50 is located in close spaced relationship to the base 124 of the gear tooth form.

A spring biased plunger 126, shown in FIG. 3, is seated in a detent 128 formed in the outer periphery of the cam ring 60 to positively index the cam ring 60 in a position where the dwell surfaces 82 hold the vanes 50 in their fully inward locked position. The shaft 14 is then locked by a solid mechanical path through each of the lock vanes 50 to the stator 24 which is connected to a suitable load carrying ground point such that a substantial torque can be directed through the shaft 14 to the rotary lock assembly 10 during testing of operating systems in the power source 48 connected to the shaft 14.

Once the power systems are suitably tested, the coupling actuator device 22 can be operated to connect the shaft 14 to the shaft 20. Thereafter, the rotary lock assembly 10 is released by conditioning the hydraulic actuator 40 to drive the piston 66 thereof in a direction to move the locking surface 132 thereon from the lug surface 130. Simultaneously, any torque on the shaft 14 will produce an instantaneous regenerative force 98 (FIG. 7) on each of the lock vanes 50 to cause them to quickly slip from their interlocked relationship with the gear teeth 92 and slide radially outwardly in each of the slots 52. In order to assure unimpeded acceleration of the shaft 14, the vanes remain held by the dwell surface 82 until the release surface 134 of the piston 66 contacts the release face 136 of the lug 62. At this point, the cam ring 60 is rotated from the lock position shown in FIG. 4 to the release position shown in FIG. 3. Concurrently, the regenerative release force 98 on each of the vanes 50 will cause them to instantaneously slide radially outwardly in the guide slots 52. At the same time, the scroll cams 102, 104 are moved with the cam ring 60 such that the cam surfaces 110, 118 thereon will positively track the heads 88 of each of the vanes 50 across the contoured inner surface 80 until the head portions 88 are rotated against the radially outwardly located dwell surfaces 84 on the cam ring 60. At this point, each of the tips 122 of each of the lock vanes 50 is located within the inner periphery 138 of the center hub 54 of the stator 24 where they are positively held by the lift mechanism 100 to prevent contact with the gear teeth 92 during rotation of the released shaft 14.

The cam ring 60 includes a second detent 140 thereon located diametrically opposite the detent.

The detent 140 is operatively engaged by a spring biased plunger 142 when the cam ring 60 is in its release position (FIG. 3) to bias the lug surface 136 against the release surface 138 of the piston 66. A pair of proximity switches 144, 146 sense which one of the detents is engaged and provides a suitable signal to an indicator for signaling the operating mode of the rotary lock assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A rotary lock assembly for securing a driven shaft while under a drive force and for releasing the driven shaft without interfering with its acceleration the combination of:
   a lock assembly stator;
   means for fixedly securing said stator against rotation;
   a driven shaft having an end extension thereon located within said stator;
   means defining a plurality of guide slots in said stator at circumferentially spaced points therearound;
   a lock vane in each of said guide slots having an inboard end and an outboard end;
   coacting means on said shaft extension engageable with said vanes to hold said driven shaft against rotation; and
   lift means for lifting each of said vanes from engagement with said shaft extension without impeding acceleration of said shaft and said lift means mechanically holding each of said vanes in a released position to prevent engagement of said tapered surfaces with the accelerated shaft;

said lift means including a cam ring and a pair of laterally spaced scroll cams;

each of said scroll cams having means thereon engageable with said vanes and operative to move said vanes into a released position with respect to said shaft extension.

2. A rotary lock assembly for securing a driven shaft while under a drive force and for releasing the driven shaft without interfering with its acceleration the combination of:

a lock assembly stator;

means for fixedly securing said stator against rotation;

a driven shaft having an end extension thereon located within said stator;

means defining a plurality of guide slots in said stator at circumferentially spaced points therearound;

a lock vane in each of said guide slots having an inboard end and an outboard end;

contacting means on said shaft extension engageable with said vanes to hold said driven shaft against rotation; and lift means for lifting each of said vanes from engagement with said shaft extension without impeding acceleration of said shaft and said lift means mechanically holding each of said vanes in a released position to prevent engagement of said tapered surfaces with the accelerated shaft;

said lift means including a cam ring and a pair of laterally spaced scroll cams;

each of said scroll cams having means thereon engageable with said vanes and operative to move said vanes into a released position with respect to said shaft extension;

a housing, a cam ring located within said housing;

a pair of axially spaced bearing means for supporting said cam ring for rotation with respect to said housing;

means for rotating said cam ring on said bearing means including an actuator cylinder and actuator shaft means having a lost motion slot therein with opposite end surfaces and means on said cam ring for locking each of said lock vanes including a plurality of circumferentially spaced dwell surface each of which engages one of said lock vanes.

3. In the rotary lock assembly of claim 2, said cam ring having an outer peripheral surface with a lug formed thereon which is directed into said lost motion slot to be held by one end surface thereof to position said cam ring in a rotated position with respect to said housing in which said dwell surfaces are aligned in overlying engagement with said vanes to prevent movement of said vanes radially outwardly of their locked position with respect to said shaft extension;

said lost motion slot having the other end surface thereon spaced from said lug when said one end surface is in engagement therewith by a distance which permits shift of said actuator shaft means from its lock position prior to rotation thereby of said cam ring and release of said vanes by the regenerative force produced thereon by the accelerating driven shaft.

4. A rotary lock assembly for securing a driven shaft while under a drive force and for releasing the driven shaft without interfering with its acceleration the combination of:

a lock assembly housing;

a driven shaft having an end extension thereon located within said housing;

a stator located within said housing and means for locking said stator fixedly with respect to said housing;

means defining a plurality of guide slots in said stator at circumferentially spaced points therearound;

a lock vane in each of said guide slots having a tapered surface on an inboard end thereof and a vane head segment thereon on the outboard end thereof and means engageable with each of said lock vanes for positioning in a lock and in a release position;

coacting means on said shaft extension engageable with said tapered surface when said vanes are positioned in their lock position to hold said driven shaft against rotation; and lift means for lifting each of said vanes from engagement with said shaft extension without impeding acceleration of said shaft and said lift means mechanically holding each of said vanes in a released position to prevent engagement of said tapered surfaces with the accelerated shaft.

5. In the rotary lock assembly of claim 4, said lift means including a cam ring and a pair of laterally spaced scroll cams;

each of said scroll cams having means thereon engageable with said vane head segments and operative to move said vanes into a released position with respect to said shaft extension.

6. In the rotary lock assembly of claim 4, said shaft extension having a plurality of involute gear teeth formed thereon with spaced inclined surfaces;

each of said vanes having tapered surfaces thereon engageable with said inclined surfaces when in their locked position;

means for directing a lock force longitudinally of each of said vanes to force said tapered surfaces toward the center of said shaft extension so as to prevent said vanes from being lifted from said lock position.

7. In the rotary lock assembly of claim 4, said shaft extension having a plurality of involute gear teeth formed thereon with spaced surfaces formed at an inclination with respect to a radial line formed from the center of said shaft extension through the base surface at the root of each of said involute gear teeth;

each of said vanes having tapered surfaces thereon held against said inclined surfaces when said vanes are in their locked position to prevent rotation of said driven shaft.

8. In the rotary lock assembly of claim 7, means engageable with said vane head segments to direct a force thereon which is radial to the center of said shaft extension for holding each of said vanes in its locked position.

9. In the rotary lock assembly of claim 7, said inclined surfaces acting on each of said vanes when they are released to direct a radially outwardly directed release force thereon upon acceleration of said loaded shaft extension which releases said vanes without impeding acceleration of said driven shaft.

10. In the rotary lock assembly of claim 4, a cam ring located within said housing;

a pair of axially spaced bearing means for supporting said cam ring for rotation with respect to said housing;

means for rotating said cam ring on said bearing means including an actuator cylinder and actuator shaft means having a lost motion slot therein with opposite end surfaces and means on said cam ring for locking each of said vanes including a plurality of circumferentially spaced dwell surfaces each of which engages said vane head segment.

11. In the rotary lock assembly of claim 10;
said cam ring having an outer peripheral surface with a lug formed thereon which is directed into said lost motion slot to be held by one end surface thereof to position said cam ring in a rotated position with respect to said housing in which said dwell surfaces are aligned in overlying engagement with said vane head segments to prevent movement of said vanes radially outwardly of their locked position with respect to said shaft extension;
said lost motion slot having the other end surface thereon spaced from said lug when said one end surface is in engagement therewith by a distance which permits shift of said actuator shaft means from its lock position prior to rotation thereby of said cam ring and release of said vanes by the regenerative force produced thereon by the accelerating driven shaft.

* * * * *